United States Patent Office 2,967,132
Patented Jan. 3, 1961

2,967,132

PROCESS OF USING BACTERIAL SPORES AS INDICATOR SYSTEM FOR DETERMINATION OF ANTIBACTERIAL ACTIVITY

Lawrence E. Sacks, Berkeley, Calif., assignor to the United States of America as represented by the Secretary of Agriculture No Drawing. Filed Sept. 3, 1959, Ser. No. 837,999

6 Claims. (Cl. 195—103.5)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel procedures for determining the antibacterial activity of substances.

In scientific and industrial fields it is often necessary to assay materials for their antibacterial activity. For example, in such diverse areas as washing eggs, rinsing restaurant dishware, preparing surgical equipment for operations, sterilizing medical products, cleaning dairy and fermentation vessels, etc., it is common to apply antibacterial solutions to the objects in question. Since the antibacterial solutions used tend to lose activity by contact with metals, bacterial matter, debris, tissue, etc., it is necessary to periodically assay the solution to determine whether or not it is still sufficiently active. Assays are also employed in such areas as checking the activity of antibacterial solutions before use or sale, testing materials of unknown composition for the presence of antibacterial agents, etc. Various techniques are available for testing for antibacterial activity. One of the most commonly used techniques involves adding graded amounts of the test specimen to samples of nutrient media, inoculating the media with a culture of a microorganism which is sensitive to the antibacterial agent in question, and incubating the inoculated media for a day or more. The cultures are then examined to note whether or not the test organism has propagated in the various cultures. This technique generally gives reliable results but has the disadvantage that the procedure is slow because of the required step of incubating the inoculated media for a day or more. In the determination of quaternary ammonium compounds, chemical methods are often employed. These techniques have the disadvantages that they are operative only with certain specific quaternaries, the end points are difficult to read, and the sensitivity of the tests is poor so that amounts less than 200 to 300 parts per million cannot be detected. Moreover, the tests are elaborate and time consuming.

The procedure in accordance with the present invention has the vital advantage of speed in that there is eliminated the long incubation period required in the prior microbiological technique to determine whether or not the test organisms will propagate in the cultures. In addition, the process of the invention is outstanding in its simplicity so that it can be utilized even by unskilled personnel. Moreover, in contrast to the known chemical methods, the procedure of the present invention offers the advantages that it is operative with all germicidal quaternary compounds, it provides a clean-cut end point, it is sensitive to as little as 25 parts per million of quaternary compounds, and it is still simple to carry out.

As noted above, the basis of the prior microbiological methods involves the influence of the substance under test on the propagation or growth of a selected microorganism.

In accordance with the present invention one determines the influence of the substance under test on the germination of bacterial spores. Since germination of spores is a very rapid process, the test in accordance with the invention yields results in a matter of minutes in contrast with the previous techniques relying on the slow process of bacterial growth, requiring one or more days for a determination. Another important advantage of the present technique is that bacterial spores are very stable and easily handled and stored. No special equipment is required as in the handling and storage of bacterial cultures. The present technique is thus especially adapted for field investigations where laboratory equipment is not available.

In carrying out a determination in accordance with the invention, dry bacterial spores are dispersed in water. The substance to be tested is added to this dispersion. Also, to make the spores germinate rapidly there is added to the dispersion a germination accelerator. Those skilled in the art are familiar with the ability of many substances to accelerate the germination of spores and any of these substances may be used. Typical of the germination accelerators are such compounds as 1-alanine, arginine, adenosine, inosine, manganese ion, caramel and various mixtures thereof. These germination accelerators exhibit a powerful biocatalytic effect and only a small amount is required, i.e., on the order of 1% by weight of the bacterial spores. Generally it is preferred to use 1-alanine, alone, or in conjunction with a nucleoside such as adenosine or inosine. It is evident that the germination accelerator which gives optimum effect with the spores of the particular bacteria used in the testing procedure may be selected in accordance with information available in the microbiological literature.

The test system is allowed to stand for a short time, on the order of 5 to 30 minutes, and then the presence or absence of germination is determined. Obviously a lack of germination indicates that the test substance has antibacterial activity against the test organism whereas if the spores have germinated, the substance is not active.

The step of determining whether or not germination has taken place may be achieved in a multitude of different ways. One system which may be used involves detection of active enzymes. Thus prior to germination, the spore dispersion exhibits essentially no enzyme activity. However, after germination takes place the enzymes are activated. Thus the presence of active enzymes may conveniently be employed as an indication that germination has taken place. The presence of active enzymes may be detected by any of the many techniques known in the field of biochemistry. A convenient technique, for example, involves adding to the dispersion a couple comprising a hydrogen-donor and a hydrogen-acceptor. The hydrogen-donor is usually glucose although other substances such as alcohol, sucrose, maltose, lactose, glycerol, mannitol, citric acid, pyruvic acid, alpha-ketoglutaric acid, tartaric acid, etc., may be used. The nature of the substance is unimportant as long as it is one which is readily oxidized by the enzymes associated with the bacteria in question. The hydrogen-acceptor may be for example, methylene blue, triphenyl tetrazolium chloride, resazurin, methyl viologen, phenazine methyl sulfate, benzyl viologen, or other substance which changes color when reduced. In using such a system germination of the spores is manifested by a color change of the added hydrogen-acceptor. The test can be operated on a basis of time required to develop a standard color change or on the basis of the degree of color change in a standard time. The change in color of the hydrogen-acceptor may be noted visually or by the use of photo-electric devices well known to those skilled in the art.

The presence of active enzymes (as an index of germination) need not necessarily be determined by oxidation-reduction reactions. Thus for instance one may rely on such manifestations as gas release, hydrolytic action or other typical enzyme-catalyzed processes. In relying on the gas released system, glucose or other sugar may be added to the dispersion whereby germination and consequent cell activity will be exhibited by release of hydrogen and/or carbon dioxide. The production of these gases may be detected by the usual chemical tests or by the use of automatic gas analyzing equipment. By addition of nitrates or nitrites to the dispersion, germination is detected by evolution of nitrogen and nitrous oxides. Other examples of substrates which may be employed to provide gas release by enzyme activity will be evident to those skilled in the art.

In regard to detecting enzyme activity by hydrolytic activity a simple technique is to add to the dispersion a substance such as an ester which will be hydrolyzed releasing free acid. The presence of free acid can be readily detected by the use of color-changing pH indicators or by pH-meters, etc. Hydrolytic action can also be determined by using a substrate which changes color on hydrolysis, for example, p-nitrophenyl acetate is hydrolyzed to the colored compound p-nitrophenol by chymotrypsin.

The occurrence of germination can alternatively be detected by turbidity measurements based on the fact that when germination occurs the turbidity of the spore dispersion decreases markedly. In this procedure the spore dispersion is mixed with the test specimen and the germination accelerator and the system is examined at intervals with a conventional colorimeter or nephelometer. A sharp drop in turbidity, usually about 30%, is indicative of germination of the bacterial spores.

Another alternative method for detecting germination of the bacterial spores involves testing for certain specific compounds released when the spores germinate. For example the compound dipicolinic acid naturally occurs in bacterial spores and is released into the dispersion when germination occurs. By carrying out suitable analytical tests at intervals, the time when this compound is present in the aqueous medium of the dispersion can be determined as an index of germination of the spores. In similar manner release of other compounds such as hexoseamine, peptides, or calcium ions may be employed to detect germination.

It is obvious that in carrying out the procedure of the invention the spores used should be those of a microorganism which is sensitive to the antibacterial agent in question. In any particular case the proper spores to employ can be selected in accordance with available information in bacteriological sources. Typical examples of spores which may be used in connection with specific antibacterial agents are listed below merely by way of illustration—

| Antibacterial agent to be tested | Spores to be used in test |
| --- | --- |
| streptomycin | Bacillus subtilis. |
| chlorotetracycline | Bacillus pumilis. |
| oxytetracycline | Do. |
| 8-hydroxy quinoline | Bacillus megaterium. |
| sulfa ti'in | Bacillus stearothermophilus. |
| aterrimins | Bacillus megaterium. |
| quaternary ammonium compounds | Bacillus globigii. |

In preparing the aqueous dispersion of bacterial spores, a small proportion of a conventional dispersing agent may be added to facilitate forming a uniform composition. For such purpose one may employ such compounds as sorbitan monopalmitate, sorbitan monostearate, sorbitan monooleate, and similar esters of sorbitan or mannitan with fatty acids containing at least six carbon atoms. Also one may use the condensation products of ethylene oxide with fat acids or with sorbitan-fat acid esters.

Generally, in conducting the test in accordance with the invention the dispersion of bacterial spores containing the material to be tested and other materials as described herein is held at room temperature (25° C.) while suitable tests or observations are made by indication of germination. If desired, however, the dispersion may be held at high temperatures, 35–45° C., to accelerate the rate of germination. The pH of the dispersion may be adjusted by addition of conventional buffering agents to provide a medium best suited for germination by the bacterial species in question. In many cases the optimum pH will be about 7.3 to 7.6.

The procedure of the invention may be employed to assay the antibacterial activity of compositions of all kinds including quaternary ammonium compounds, antibiotics, mercurials, phenolic compounds, sulfa drugs, quinoline compounds, benzoic acid and its derivatives, etc.

The invention is further demonstrated by the following illustrative examples.

Example I

Dry spores of *Bacillus globigii* were dispersed in water, in the proportion of 10 mg. of spores per ml. of water.

In each of a series of long, narrow glass tubes was placed 2 ml. of the spore dispersion plus 3 ml. of a solution of cetyl trimethyl ammonium bromide of known concentration.

To each tube was then added 5 ml. of a solution containing:

| | Mg. |
| --- | --- |
| Methylene blue | 5 |
| Glucose | 18 |
| Phosphate buffer, pH 7.3 | 0.15 |
| Adenosine | 4 |
| l-alanine | 4 |

Water to make 5 ml.

The materials in each tube were thoroughly mixed and the tubes held at room temperature while observing them for color change. The results obtained are tabulated below:

| Concentration of cetyl trimethyl ammonium bromide in test solution, parts per million | Time for decolorization of methylene blue, min. |
| --- | --- |
| 0 | 10. |
| 25 | 15. |
| 50 | 35. |
| 75 | 60. |
| over 75 | no decolorization. |

Example II

The tests described in Example I were repeated using solutions of cetyl pyridinium chloride instead of cetyl trimethyl ammonium bromide. The results are as follows:

| Concentration of cetyl pyridinium chloride, parts per million | Time for decolorization of methylene blue, min. |
| --- | --- |
| 25 | 21. |
| 50 | 34. |
| 100 | did not decolorize in 70 hrs. |

Having thus described the invention, what is claimed is:

1. A process for determining the antibacterial activity of a substance by measuring the activity of the substance in inhibiting spore germination which comprises dispersing dry bacterial spores in water, adding to the resulting dispersion the said substance, a germination accelerator, a hydrogen-donor and a hydrogen-acceptor capable of changing color when reduced, allowing the system to stand, and ascertaining the activity of the substance by the time required for development of a color change of the hydrogen-acceptor being an index of germination of the spores.

2. The process of claim 1 wherein the germination accelerator is 1-alanine.

3. The process of claim 1 wherein the germination accelerator is adenosine.

4. The process of claim 1 wherein the hydrogen-donor is a sugar.

5. The process of claim 1 wherein the hydrogen-donor is glucose.

6. The process of claim 1 wherein the hydrogen acceptor is methylene blue.

References Cited in the file of this patent

UNITED STATES PATENTS 2,019,950   Bunzell _____ Nov. 5, 1935

FOREIGN PATENTS 203,451   Australia _____ Sept. 27, 1956

OTHER REFERENCES

Lilly et al.: "Physiology of the Fungi," copyright 1951 by McGraw-Hill Book Co., Inc., pages 361 to 369.

Levine: "Bactericological Reviews," vols. 16–17 (1952–53), pages 117–124.